May 23, 1933.  E. H. BINNS  1,910,742

FISHING LURE

Filed May 14, 1931

Inventor
Emmet H. Binns

By James P. Burns,

Attorney

Patented May 23, 1933

1,910,742

UNITED STATES PATENT OFFICE

EMMET H. BINNS, OF COLUMBUS, OHIO

FISHING LURE

Application filed May 14, 1931. Serial No. 537,431.

This invention relates to an artificial bait or lure, an object of the invention being the provision of a lure which will rock or oscillate when drawn through the water so as to move with a sinuous motion, simulating that of a minnow or small fish.

Another object of the invention is to provide an improved lure with a substantially spoon-shaped plate and an attached hook, which plate is so formed and the hook so attached that the lure will take a position in the water preventing the same from making a complete revolution therein when drawn therethrough.

Another object of the invention is to so distribute the combined mass of the plate and hook with respect to the center of gravity thereof that the lure will have, when pulled through the water, a uniform pendular motion about an axis substantially that of the propelling fishing line.

Another object of the invention is to so shape the spoon that as a result of its arcuate movement, in performing a pendular motion, the work done in overcoming friction with the water and causing turbulence is not sufficient to damp out the pendular oscillations.

A further object of the invention is to so shape the spoon that the reaction of the water opposing its pendular motion serves to increase the period of oscillation over that of an equivalent pendulum in air or vacuum, but does not ultimately prevent such motion.

Another object of the invention is to provide an improved lure with a spoon-shaped plate to which a hook which may be provided with a streamer is secured and which plate is so formed that it tends to keep the lure at any desired depth by varying slightly the pull thereof through the water.

A still further object of the invention is to shape the spoon and arrange the hook connected therewith so that the lure will ride over and avoid becoming caught in obstacles lying on the bottom of the lake or river.

With these and other objects in view, which will appear as the description proceeds, the invention consists in the novel features of construction, combinations of elements and arrangements of parts hereinafter to be more fully described and pointed out in the appended claims.

In the accompanying drawing is shown the preferred form of the invention, in which Figure 1 is a top plan view of the lure comprising the present invention;

Figure 1:
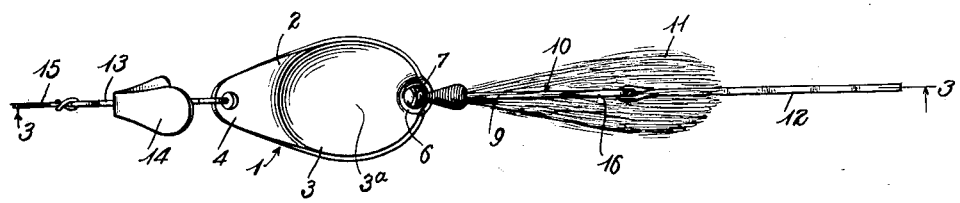
Figure 2:
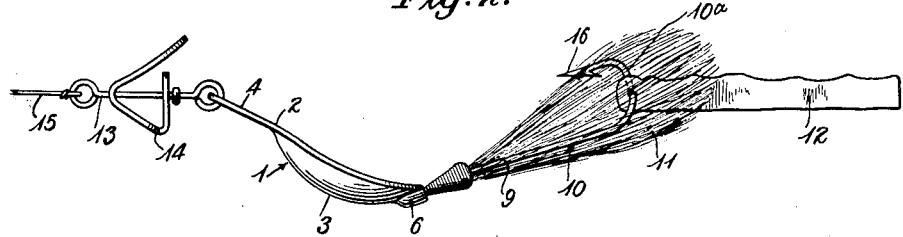
Fig. 2 is a side elevation thereof.
Figure 3:
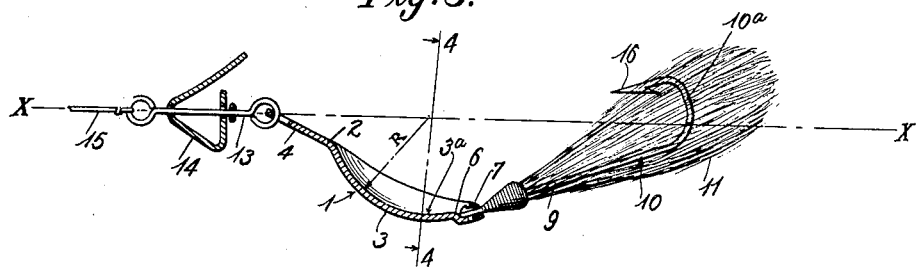
Fig. 3 is a longitudinal section taken on the line 3—3 of Figure 1 with the pork rind omitted.

Referring more particularly to the accompanying drawing, the numeral 1 designates the lure in its entirety, which lure includes a rigid body or plate 2. The body 2 is usually formed of polished metal and comprises a spoon-like portion 3 substantially elliptical in outline and a flat forwardly extending portion 4. The spoon-like portion 3 of the body 2 extends below the plane of the flat portion 4 with its convex side downward so as to resemble a fish body in appearance and, as shown at 5 in Figure 3, is arcuate in lateral cross-section so as to decrease the amount of water necessary to be displaced by the pendular motion of the lure hereinafter described. The rear end of the spoon portion terminates approximately in the plane of the flat portion 4 and is provided with a depression or seat 6 in which is positioned and secured by means of a threaded fastening element 7 an eye formed integrably with the shank 9 of a fish hook 10. By means of the depression 6 the hook 10 is rigidly held in place and prevented from moving sideways with respect to the spoon. The hook is thus positioned and held so that its curved portion 10ª lies in a plane which is normal to the flat portion of the plate 3 and includes the longitudinal axis of the spoon. The recess 6 is formed upon the upwardly curved portion of the rear portion 3 of the spoon in such a manner that the bottom of the recess is at an angle to the plane of the flat portion 4. The shank 9 of the hook is thereby held at an angle to the plane of the flat portion 4. This angle is preferably made approximately 45° but it may be varied considerably without materially affecting the said pendular motion of the fish lure but should not be made less than approximately 22° for successful operation. It is obvious that this angle may be varied by slightly bending the shank 9 of the hook adjacent the recess 6.

If desired the hook may also be provided with a feather, streamer or the like 11 which covers the hook and extends a considerable distance to the rear thereof. In some instances a pork rind or ribbon 12 of other similar material may be fastened to the hook and disposed to the rear thereof, and which ribbon is free to wiggle or vibrate sideways in response to vibrations caused by the above mentioned pendular motion of the lure and its passage through the water, thereby imparting to the lure a lifelike appearance.

The forward end of the plate or body 2 has connected thereto one end of a rod 13 which has its other end adapted to be connected to a fishing line 15. The connection between the rod 13 and the plate 2 is such that the latter will have a free rocking or swinging movement with respect to said rod and not impart any movement to the fishing line. A spinner 14 is swiveled on the rod 13 and provided with a plate 16 which is slightly curved and set at an angle so as to cause the spinner to rotate when the bait or lure is drawn forwardly through the water.

The lure when drawn through the water at a speed satisfactory for trolling assumes a position, approximately that shown in Figure 3. It will be noted that the center of gravity of the plate and hook will lie slightly above the top surface 3a of the plate and adjacent the middle of the curved portions 3. As will be understood, the plate and hook form a compound pendulum capable of pivotal motion about the axis of the line indicated by the line X—X on Figure 3. If such a system be acted upon by a varying force, it will tend to oscillate with a uniform period. The necessary fluctuating force is supplied by the water impinging upon the under surface of the plate 2 due to its forward motion. Then if the energy losses acting upon the system are kept below a critical value, a pendular oscillation will take place.

Figure 4:
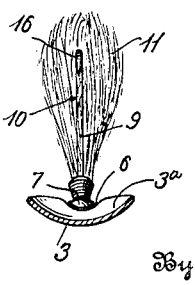
Fig. 4 is a transverse sectional view taken on the line 4—4 of Figure 3.

In the form of the invention illustrated the plate 2 is so constructed that its center of gravity is a substantial distance from the axis of the line but the mass is so distributed that very little turbulence due to displacement of water will be caused by the plate in its arcuate movement. It can clearly be seen from Figure 4 that the transverse section of the spoon portion 3 is substantially concentric with the axis of the line and in performing the said arcuate movement the plate moves edgewise through the water. In the preferred embodiment of the invention, the curvature of each surface of the spoon portion 3 is made substantially that of the surface of a sphere with its center on or near the axis of the line such that any transverse section normal to said axis closely approaches a circular arc, with its center at or near the axis of the line. The radius of the curved upper surface 3a is indicated on Figures 3 and 4 by R.

The structure described enables the center of gravity of the plate to take a position a considerable distance from the axis of the line when being pulled through the water and also avoids an undesirable concentration of the mass below the said axis such that relatively large lateral areas are required to be forced through the water by any pendular motion. Thus the energy losses due to arcuate movement are kept below the critical value which will prevent pendular oscillations and are merely sufficient to prevent undesirable complete revolutions of the lure.

It will be noted that the transverse arcuate shape of the spoon tends to keep the center of gravity of the lure at a uniform distance from the axis of the line. The plate normally tends to swing such that its transverse curvature at any point is equal to the curvature of its pendular motion at that point. If the spoon were to approach nearer to the axis of the line its transverse curvature at any point would be less than the curvature of the pendular motion and a reaction of the water due to the arcuate motion would be immediately set up tending to move the spoon away from said axis. The reverse action would take place if the spoon were to move farther away from the axis of the line.

A complete lure constructed as above described and of satisfactory dimensions for trolling when either pulled through still water or observed while held from longitudinal movement in a moving current of water by a line exhibits a relatively slow, uniform, pendular oscillation with an amplitude of approximately 135°. This motion imparts to the lure when pulled through water a sinuous motion very like that of a minnow or small fish when swimming.

Experimental data obtained by holding the lure by means of a line from longitudinal movement in a flow tank equipped with current meters showed that the time of a single swing for a current velocity of 2.13 feet per second was very close to .19 seconds or that the pendular motion had a period of .38 seconds. Further experiment showed this period to be practically independent of current velocity within wide limits and also independent of whether or not the lure was provided with a spinner or pork rind. Several different styles of spinners and various numbers of pork rinds attached to the hook were tried without appreciably changing the period. This latter result was to be expected since the centers of gravity of the spinner and pork rind are at or very near the axis of the pendular motion and their moments of inertia are small. The above discussion is intended to show that the rocking motion of the lure is in fact a pendular oscillation.

The same lure suspended in air in substantially the same position as it assumes in water so as to free to pivot about the axis of the line acted as a pendulum and required approximately .125 seconds for a single swing or had a period of oscillation of .250 seconds. It is noted that the period in water is somewhat greater than that in air. This is believed to be due to two factors; the inertia of the water, since a certain amount of water must be moved by the lure in performing its pendular motion, and the buoyancy of the water in lessening the effect of gravity.

In order that a device may be easily constructed according to the teachings of my invention, the approximate dimensions of the important elements of the lure used in the above described experiments are given:—

| | Inches |
|---|---|
| Length of plate 2 after forming | 1.8 |
| Maximum width of plate after forming | 0.9 |
| Length of flat portion 4 | 0.5 |
| Thickness of plate | 0.05 |
| Radius of curvature of surface 3a | 0.75 |

These dimensions are given by way of example only. It is obvious that the lure may be made of any size desired and that the shape and relative size of the elements may be varied.

The lure, due to the peculiar formation of the body 2 and the arrangement of the hook 10, may be kept at any desired depth when drawn through the water by varying slightly the speed and pull thereon. As the forward end of the plate is positioned at an angle when passing through the water, and as the prong or hook proper 16 is directed upwardly the lure will ride over stones or other objects when traveling on or near the bottom without catching thereon, making the lure particularly adaptable for shallow water fishing.

Although I have shown and described the preferred form of the invention, it will be understood that I do not desire to be limited to the details as set forth, since these may be modified within the scope of the appended claims without departing from the spirit of the invention.

Having thus described my invention, what I claim is:—

1. A fishing lure comprising an elongated body of substantially uniform thickness having its rear end substantially spoon-shaped and its forward end substantially flat, said spoon portion having upper and lower surfaces which are substantially spherical and concentric, a fish hook rigidly secured to the rear end of said body, said hook being arranged in the plane of the longitudinal axis of the body and being positioned upwardly at an angle thereto, the center of gravity of said body and hook being a substantial distance from the axis of a line, when the lure is pulled through water thereby, so as to cause a substantially uniform pendular oscillation of the lure in water.

2. A fishing lure adapted to be pulled through water by a line, said lure comprising: a plate of substantially uniform thickness, said plate having a front flat portion and a rear spoon portion, the flat portion of the lure being positioned substantially in the plane of the upper edge of the spoon portion, the top and bottom edges of transverse cross sections of the spoon portion, taken normal to the axis of the line, being substantially the shape of concentric circular arcs with their centers adjacent the axis of the line; and a fish hook rigidly secured to the spoon portion of the lure, said hook being positioned in the plane of the longitudinal axis of the lure and extending rearwardly from the spoon portion and upwardly at an angle to the plane of the flat portion of the lure, whereby the end of the hook remote from the lure maintains a position adjacent the axis of the line.

3. A fishing lure adapted to be pulled through water by a line, said lure comprising a body of substantially uniform thickness, said body having a spoon portion and a flat portion, said flat portion extending forwardly from the spoon portion and being positioned substantially in the plane of the upper edge of the spoon portion, and a fish hook rigidly attached to the spoon portion, said hook being positioned in the plane of the longitudinal axis of the body and extending rearwardly from said spoon portion and upwardly at an angle to the plane of the flat portion, said spoon portion having upper and lower surfaces which are substantially spherical and concentric.

EMMET H. BINNS.